US006585148B2

United States Patent
Aono et al.

(10) Patent No.: US 6,585,148 B2
(45) Date of Patent: Jul. 1, 2003

(54) WELDING PROCESSES FOR IRON-BASE ULTRA FINE GRAINED MATERIALS AND STRUCTURAL COMPONENTS MANUFACTURED BY THE PROCESSES

(75) Inventors: Yasuhisa Aono, Hitachi (JP); Ryo Ishibashi, Hitachi (JP); Kazutaka Okamoto, Hitachi (JP); Masayuki Doi, Hitachinaka (JP); Hisanori Okamura, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/081,181

(22) Filed: Feb. 25, 2002

(65) Prior Publication Data

US 2003/0047587 A1 Mar. 13, 2003

(30) Foreign Application Priority Data

Mar. 15, 2001 (JP) ......................................... 2001-074463

(51) Int. Cl.$^7$ ........................... B23K 20/12; B23K 31/02
(52) U.S. Cl. .................................. 228/112.1; 228/262.4
(58) Field of Search ........................... 228/112.1, 262.4, 228/262.41, 2.1; 156/73.5

(56) References Cited

U.S. PATENT DOCUMENTS

| 6,050,474 | A  | * | 4/2000  | Aota et al. | 228/112.1 |
| 6,237,829 | B1 | * | 5/2001  | Aota et al. | 228/2.1   |
| 6,302,314 | B1 | * | 10/2001 | Horio et al. | 228/103  |
| 6,305,866 | B1 | * | 10/2001 | Aota et al. | 228/112.1 |
| 6,378,754 | B2 | * | 4/2002  | Aota et al. | 228/112.1 |
| 6,382,498 | B2 | * | 5/2002  | Aota et al. | 228/112.1 |
| 6,398,883 | B1 | * | 6/2002  | Forrest et al. | 148/516 |
| 6,419,144 | B2 | * | 7/2002  | Aota et al. | 228/112.1 |

FOREIGN PATENT DOCUMENTS

| EP | 0752926   | B1 |   | 5/1998 |
| EP | 1240969   | A2 | * | 9/2002 |
| JP | 9-192838  |    |   | 7/1997 |
| JP | 11-170088 |    |   | 6/1999 |
| JP | 2000-15462|    |   | 1/2000 |
| JP | 2000-246438|   |   | 9/2000 |

OTHER PUBLICATIONS

1st International Symposium on Friction Stir Welding (Jun. 14–16, 1999); Lienert et al: Friction Stir Welding of Mild Steel.
The Second Symposium on Super Metal (1999), pp. 11–19 & 31–38.
The Fourth Symposium on Ultra–Steel (2000) pp. 1–10.
Abstract of JP 62–64486 (Mar. 23, 1987).
Nagai, "Studies On Creation And Joining For 800 MPa–class Ultrafine Grain Ferrite Steels" (2000), pp. 1–5 (with trans. of pp. 4–5).

* cited by examiner

Primary Examiner—Tom Dunn
Assistant Examiner—Colleen P. Cooke
(74) Attorney, Agent, or Firm—Antonelli, Terry, Stout & Kraus, LLP

(57) ABSTRACT

Structural components obtained by a process for welding iron-base materials, where the iron-base material is iron-base fine grained materials free from any amorphous phase, which comprises welding two kinds of fine grained materials of chemical and crystallographically same or different kinds from one another, whose average grain sizes d are in a range of $10 \text{ nm} < d \leq 5 \times 10^3$ nm, etc., by friction stir welding can maintain distinguished properties of fine grained materials, such as strength and corrosion resistance.

19 Claims, 6 Drawing Sheets

4mm

4mm

100 μm

20 μm

WELDING PROCESSES FOR IRON-BASE ULTRA FINE GRAINED MATERIALS AND STRUCTURAL COMPONENTS MANUFACTURED BY THE PROCESSES

BACKGROUND OF THE INVENTION

The present invention relates to a nonfusion welding process for iron-base ultra-fine grained materials and particularly to welded structural components with distinguished properties, such as strength, corrosion resistance, etc. inherited from the ultra-fine grained materials.

In conventional welding processes for assembling structural components of metallic materials, a welding process for melting parts of a material placed together, edge by edge, is popular.

The structure of the material at the fused parts is broken up by welding to form a solidification structure, and fine grains in the heat-affected zone grow to coarse grains. To suppress such a grain growth to coarse grains in the heat-affected zone as strongly as possible, laser welding (JP-A-11-170088), electron beam welding (JP-A-62-64486), micro-arc welding (JP-A-192838), narrow gap welding (JP-A-2000-246438), etc., all of which can reduce the welding heat input to a base metal, have been proposed.

Furthermore, a welding process, which comprises placing welding pieces together, edge to edge, allowing them to rotate at high speed to effect welding by friction heating (JP-A-2000-015462) has been proposed.

As welding processes without melting of the base metal, on the other hand, solding and brazing processes based on melting of a low melting point filler are now available.

To obtain desirable properties of materials such as strength, corrosion resistance, etc., processes for making crystal grains ultra-fine have been also recently proposed. For example, many iron-base ultra-fine materials having grain sizes of not more than 5 μm are now under development [e.g. The second Symposium on Super Metal (1999): by The Japan Research and Development Center for Metals (a foundational judicial person), etc. and The Fourth Workshop on Ultra-Steel (2000) by National Research Institute for Materials, belonging to Science and Technology Agency, Japan].

When structural components are assembled through joints formed not by soldering and blazing, but by melting of ultra-fine grained materials, the temperature of the welding zone is elevated to the melting point so long as welding is carried out by melting, even if laser welding, electron beam welding, micro-arc welding or narrow gap welding is used as a means of low heat input welding, and consequently the ultra-fine structure with controlled grain sizes will be broken up at the welding zone, and thus growth of such ultra-fine crystal grains to coarse grains is inevitable in the heat-affected zone.

Deformation of welding joints is inevitable in the course of solidification and cooling after the melting. Butt friction welding is not suitable for assembling welded structural components including ordinary plate materials.

SUMMARY OF THE INVENTION

An object of the present invention is to provide a nonfusion welding process for iron-base ultra-fine grained materials having the finest grain sizes among the iron-base materials widely used as structural materials, while keeping their distinguished properties of ultra-fine grained materials as inherited to a maximum, and also to provide structural components manufactured by the process.

The present invention provides a process for welding iron-base materials, which comprises welding the same or different kinds of iron-base materials, at least one of which is an iron-base ultra-fine grained material free from any amorphous phase and having an average grain size d in a range of $10 \text{ nm} < d \leq 5 \times 10^3$ nm, by friction stir welding.

The present invention also provides a process for welding iron-base materials, where the iron-base materials are iron-base ultra-fine grained materials free from any amorphous phase, which comprises welding (a) two kinds of the ultra-fine grained materials of chemically and crystallographically same or different kinds, whose average grain sizes d are in a range of $10 \text{ nm} < d \leq 5 \times 10^3$ nm or (b) one kind of the ultra-fine grained material, whose average grain sizes d are in a range of $10 \text{ nm} < d \leq 5 \times 10^3$ nm with another kind or other kinds of the grained materials of chemically and crystallographically same or different kinds, whose average grain sizes d are in a range of $5 \times 10^3$ nm d, by friction stir welding.

Furthermore, the present invention provides a process for welding iron-base materials, where the iron-base materials are austenitic stainless steel, which comprises welding (a) two kinds of the stainless steel from one another, whose average grain sizes d are in a range of $10 \text{ nm} < d \leq 5 \times 10^3$ nm, or (b) one kind of the fine grained stainless steel, whose average grain sizes d are in a range of $10 \text{ nm} < d \leq 5 \times 10^3$ nm, with another kind of the stainless steel, whose average grain sizes d are in a range of $5 \times 10^3 \text{ nm} < 3$, by friction stir welding.

Still furthermore, the present invention provides a process for welding iron-base materials, where the iron-base materials are ferritic stainless steel with not more than 0.12 wt. % C, free from any of martensite phase and tempered martensite structure, which comprises welding (a) two kinds of the stainless steels, whose average grain sizes d are in a range of $10 \text{ nm} < d \leq 5 \times 10^3$ nm, or (b) one kind of the fine grained steel, whose average grain sizes d are in a range of $10 \text{ nm} < d \leq 5 \times 10^3$ nm, with another kind of the stainless steel, whose average grain sizes d are in a range of $5 \times 10^3 \text{ nm} < d$, by friction stir welding.

In the present invention, other iron-base materials such as two-phase stainless steel, ultra-fine grained austenitic stainless steel, ferritic stainless steel, etc. can be likewise used for the welding, as will be mentioned later.

In the present invention, as the iron-base materials there can be used two-phase stainless steel, fine grained materials of austenitic stainless steel, ferritic stainless steel, two-phase stainless steel, etc. as explained below.

Other objects, features and advantages of the invention will become apparent from the following description of the embodiments of the invention taken in conjunction with the accompanying drawings.

DETAILED DESCRIPTION OF THE INVENTION

Figure 1:
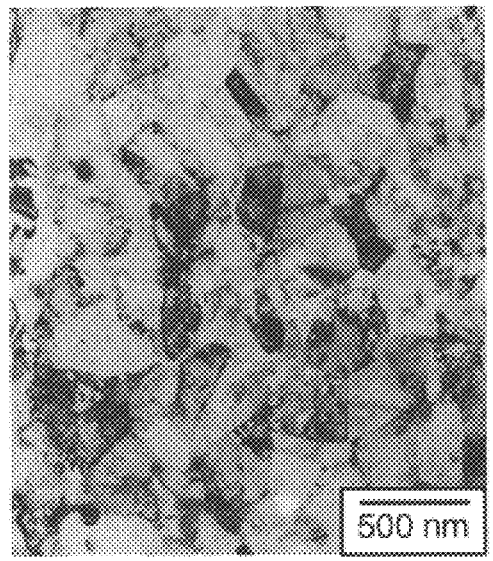
FIG. 1 is a TEM structural picture of ultra-fine grained stainless steel (SUS 304).

To attain the aforementioned object, the present invention provides welding of iron-base fine grained materials, whose major component is iron, crystallographically free from any amorphous phase, where two fine grained materials of chemically and crystallographically same or different kinds, whose average grain sizes d are in the same range as $10\text{ nm} < d \leq 5 \times 10^3$ nm, are welded to each other by friction stir welding, i.e. a nonfusion welding process. In manufacturing welded structural components from the fine grained materials, welding of the fine grained materials is effected by friction stir welding.

The present invention is further characterized by welding one kind of iron-base fine grained material, whose average grain sizes d are in a range of $10\text{ nm} < d \leq 5 \times 10^3$ nm, with another kind of iron-base fine grained material of chemically and crystallographically same or different kinds, whose d is in a range of $5 \times 10^3\text{ nm} < d$, by friction stir welding, i.e. a nonfusion welding process. In manufacturing welded structure components from the fine grained materials, welding of fine grained materials is effected by friction stir welding.

The present invention concerns particularly welding of austenitic stainless steel, ferritic stainless steel with not more than 0.12 wt. % C, free from any of martensite phase tempered martensite phase, and two-phase stainless steel with both austenite phase and ferrite phase together, characterized by welding two kinds of said steels, whose average grain sizes d are in the same range of $10\text{ nm} < d \leq 5 \times 10^3$ nm, with one another by friction stir welding, i.e. a nonfusion welding process. In manufacturing welded structural components from the fine grained materials, welding of fine grained materials is effected by friction stir welding. The present invention also includes welding of stainless steel of chemically and chrystallographically different kinds in the aforementioned stainless steel.

Still furthermore, the present invention concerns welding of austenitic stainless steel, ferritic stainless steel free from any of martensite phase and tempered martensite phase with not more than 12 wt. % C, and two-phase stainless steel with both austenite phase and ferrite phase together, characterized by welding one kind of fine stainless steel, whose average grain sizes d are in a range of $10\text{ nm} < d \leq 5 \times 10^3$ nm, with another kind of stainless steel, whose d is in a range of $5 \times 10^3\text{ nm} < d$, by friction stir welding. In manufacturing welded structural components from the fine grained materials, welding of fine grained materials is effected by friction stir welding. The present invention also includes welding of stainless steel of chemically and crystallographically different kinds in the aforementioned stainless steels.

Still furthermore, the present invention concerns welding of ferritic steels including low-alloy steels, etc. of fine grained materials as non-stainless steels with not more than 7 wt. % Cr and with a ferrite phase base metal, and carbon steel, characterized by welding two kinds of said steel of chemically and crystallographically same or different kinds, whose average grain sizes d are in a range of $10\text{ nm} < d \leq 5 \times 10^3$ nm, with one another by friction stir welding. In manufacturing welded structural components from the fine grained materials, welding of fine grained materials is effected by friction stir welding.

In the ferritic steels including low-alloy steels, etc. as non-stainless steels with not more than 7 wt. % Cr and with a ferrite phase base metal and carbon steel, the present invention is characterized b welding one kind of the aforementioned steel of fine grained materials, whose average grain sizes d are in a range of $10\text{ nm} < d \leq 5 \times 10^3$ nm, with another kind of the aforementioned steel, martensitic stainless steel and mild steel of chemically and crystallographically the same or different kinds, whose average grain sizes d are in a range of $5 \times 10^3\text{ nm} < d$, by friction stir welding. In manufacturing welded structural components from the ultra-fine grained materials, welding of fine grained materials is effected by friction stir welding.

The present invention is still furthermore characterized by welding one kind of austenitic stainless steel, ferritic stainless steel and two-phase stainless steel consisting of fine grained materials, whose average grain sizes d are in a range of $10\text{ nm} < d \leq 5 \times 10^3$ nm, with another kind of ferritic steel with not more than 7 wt. % Cr of non-stainless steel of fine grained materials, whose average grain sizes d are likewise in a range of $10\text{ nm} < d \leq 5 \times 10^3$ nm, and carbon steel by friction stir welding. In manufacturing welded structural components from the fine grained materials, welding of fine grained materials is effected by friction stir welding.

The present invention is still furthermore characterized by welding one kind of austenitic stainless steel, ferritic stainless steel and two-phase stainless steel of fine grained materials, whose average grain sizes d are in a range of $10\text{ nm} < d \leq 5 \times 10^3$ nm with another kind of ferritic steel with not more than 7 wt. % Cr of non-stainless steel grained materials, whose average grain sizes d are in a range of $5 \times 10^3\text{ nm} < d$, and carbon steel, and furthermore martensitic stainless steel and mild steel by friction stir welding. In manufacturing welded structural components from the fine grained materials, welding of fine grained materials is effected by friction stir welding.

The present invention is still furthermore characterized by welding one kind of ferritic stainless steel with not more than 7 wt. % Cr, of non-stainless steel grained materials, whose average grain sizes d are in a range of $10\text{ nm} < d \leq 5 \times 10^3$ nm, and carbon steel and another kind of austenitic stainless steel, ferritic stainless steel and two-phase stainless steel, whose average grain sizes d are in a range of $5 \times 10^3\text{ nm} < d$, by friction stir welding. In manufacturing welded structural components from the fine grained materials, welding of fine grained materials is effected by friction stir welding.

The present invention concerns structural components made by friction stir welding of ferritic steel with not more than 7 wt. % Cr, carbon steel, where the zones including friction stir welding zone are annealed in a range of 600° to 850° C.

In the present invention, friction stir welding of iron-base fine grained materials is carried out in a coolant selected from water, oil and inert gases, or while spraying the coolant in the vicinity or over the whole of the welding zone.

The friction stir welding is a method which comprises pressing a high speed-rotating bar (tool) of a heat-resistant, hard-to-react material to parts of metallic pieces to be welded on both sides, thereby readily elevating the temperature of the parts to higher temperature of not more than the melting point due to the generated heat of friction and giving rise to plastic flow of the parts of the metallic pieces to be welded to effect stir welding of the parts on both sides.

By moving the tool along the weld line, welded structural components including straight welding and curved welding can be obtained.

In the conventional butt friction welding, it is hard to obtain straight welding and curved welding. Due to the innovation of various material structure control processes ultra-fine grains having average grain sizes of not more than 5 µm or even not more than 100 nm have been produced in case of iron-base materials [e.g. The second Symposium on Super Metal (1999) by The Japan Research and Development Center for Metals (a foundation judicial person) Japan, etc. and The fourth Workshop on Ultra-Steel (2000) by National Research Institute for Materials, belonging to Science and Technology Agency, Japan].

However, such distinguished properties of materials with the fine grains as strength, corrosion resistance, etc. have not been utilized in the welded structural components because such an fine grained structure cannot be maintained throughout the conventional welding processes, and thus have been limited to uses as non-weldable structural components.

Attempts to deal with the conventional welding processes by low heat input welding, particularly by narrow welding have been already made [e.g. The fourth Workshop on Ultra-Steel (2000), by National Research Institute for Materials, belonging to Science and Technology Agency, Japan], but structure breaking-up at joints and coarsening of crystal grains in the heat-affected zones are inevitable.

Friction stir welding of iron-base materials can be carried out by use of a tool with a resistance high enough to withstand elevated temperatures due to heat generation between the tool and pieces to be friction stir welded when the high speed rotating tool is pressed into the pieces and also by the resulting plastic flow and stirring and also by use of an apparatus with a rigidity high enough to withstand upward pressures developed from within the stirring zone.

Generally, friction stir zone temperature is not more than the melting point. In case of Al alloy for reference [Masatoshi Enomoto: Light Metal Welding 36 (1998), 25 or Hisanobu Okamura, Kinya Aota and Masakuni Ekado: Light Metal 50 (2,000), 166–172], it corresponds to ⅔ of the melting point in terms of Celsius temperature grades. That is, the melting point is 1,500° C. and thus the friction stir zone temperature of the neighboring iron-base materials would be about 1,000° C.

At the friction stir zone temperature, the structure of the friction stir zone, i.e. grain sizes, would grow more than the fine grains of the base metal would do, but the material structure formed after the melting in case of welding is not a solidification structure resulting in no solidification shrinkage.

Also the heat-affected zone of the part in the close vicinity of the friction stir zone receives less heat hysteresis of temperature-time, so that the grains will not grow so much.

Due to these effects, the present invention can have such advantages as less quality change and less deformation of the materials after the welding than those in case of the conventional welding processes.

Grain growth of ultra-fine grains is suppressed by pinning of dispersed fine particles of the compound, etc. That is, in the iron-base materials of fine grains made by forming structurally dispersed fine particles of the materials, superplasticity can be also utilized in the plastic deformation at elevated temperatures, which is so called "stirring", and the effect of grain boundary pinning of the existing ultra-fine dispersed particles is also added thereto to make higher the effect of suppression of grain growth during the welding.

Thus, in the friction stir welding, the best effect can be obtained with austenic stainless steel, ferritic stainless steel and two-phase stainless steel with an austenite phase and a ferrite phase together, all of whose average grain sizes d are $10 \text{ nm} < d \leq 5 \times 10^3$ nm, or with fine grained materials such as ferritic steel with a ferrite phase base metal as non-stainless steel and carbon steel, where fine ferrite phase grains of non-stainless steel designate neither ordinary hardened structure nor tempered structure, but a sintered structure of highly processed powder or a structure of highly rolled, processed and heat-treated plate materials, though similar to each other in composition, which comprises ultra-fine grains of carbide, etc. as precipitated in the ferrite phase.

However, when the welding temperature falls within the hardening temperature range in the friction stir welding of the non-stainless steel materials, there is a fear that a hardening effect occurs, even if the counterpart is a stainless steel joint. Thus, a good joint can be obtained by carrying out heat treatment to temper the parts including the joint.

When parts or the whole of welded structural components are made from the aforementioned fine grained materials, features of the aforementioned friction stir welding can be incorporated into the structural components.

To thoroughly maintain the distinguished properties of fine grained materials and much more reduce the residual stress in the welded structural components and the deformation of the structural component, it is more effective to cool the joints, during the welding, with any of such coolants as water, oil and an inert gas capable of accelerating the cooling speed around the joints.

The present invention will be described in detail below, referring to Examples and Drawings.

EXAMPLE 1

Table 1 shows chemical composition of plate test pieces subjected to tests of the present friction stir welding, i.e. butt welding, where austenic stainless steel (Nos. 1, 2, 3 and 4), ferritic stainless steel (Nos. 5 and 6), two-phase stainless steel (No. 7), ferritic steel (No. 8) and carbon steel (No. 9) with a ferrite phase base metal as non-stainless steel, which are typical of fine grained materials, and typical materials (Nos. 10–16) having ordinary grain sizes (not less than 5 µm), which are chemically, crystallographically and structurally closest to the aforementioned materials, are given.

Test pieces Nos. 17 and 18 are also shown in Table 1 as counterpart members to be welded to the fine grained materials.

Table 1 also shows average grain sizes, and tensile strength and plastic elongation of the test pieces as strength data.

Measurement of grain sizes was carried out on the TEM-observed dark-field images for materials having average grain sizes of not more than 2 µm and on SEM-observed images for those having average grain sizes of more than 2 µm. Test pieces Nos. 15 and 17 had a hardened and tempered structure, where old austenite grain sizes are shown as grain sizes.

TABLE 1

| Test pieces | | Principal chemical composition (wt. %) | | | | | | | | | | | Average grain size d | Tensile strength (MPa) | Elongation (%) |
|---|---|---|---|---|---|---|---|---|---|---|---|---|---|---|---|
| No. | Material identification | C | Si | Mn | P | S | Ni | Cr | Mo | Ti | N | O | | | |
| 1 | SUS304* | 0.090 | 0.52 | 0.14 | 0.019 | 0.005 | 10.3 | 18.72 | — | 0.45 | 0.02 | 0.04 | 250 nm | 1150 | 25 |
| 2 | SUS316* | 0.087 | 0.38 | 1.26 | 0.011 | 0.007 | 12.44 | 16.86 | 2.24 | 0.43 | 0.03 | 0.04 | 240 nm | 1165 | 24 |
| 3 | SUS304** | 0.067 | 0.61 | 1.03 | 0.016 | 0.005 | 8.34 | 18.45 | — | — | 0.01 | 0.006 | 430 nm | 850 | 35 |
| 4 | SUS316** | 0.052 | 0.48 | 1.1 | 0.009 | 0.004 | 12.7 | 17.8 | 2.08 | — | 0.02 | 0.005 | 640 nm | 803 | 36 |
| 5 | SUS410L* | 0.092 | 0.55 | 0.67 | 0.02 | 0.007 | — | 11.85 | — | 0.46 | 0.02 | 0.04 | 92 nm | 1306 | 8 |
| 6 | SUS430* | 0.095 | 0.67 | 0.82 | 0.024 | 0.003 | — | 16.98 | — | 0.47 | 0.03 | 0.04 | 320 nm | 1160 | 12 |
| 7 | SUS329J1* | 0.089 | 0.59 | 1.19 | 0.011 | 0.007 | 4.63 | 25.14 | 2.4 | 0.44 | 0.03 | 0.05 | 1020 nm | 785 | 25 |
| 8 | SQV1A* | 0.176 | 0.211 | 1.35 | 0.021 | 0.009 | — | — | — | — | 0.05 | 0.04 | 620 nm | 880 | 18 |
| 9 | STPG370* | 0.182 | 0.233 | 0.77 | 0.026 | 0.031 | — | — | — | — | 0.04 | 0.03 | 560 nm | 920 | 16 |
| 10 | SUS304† | 0.067 | 0.61 | 1.03 | 0.016 | 0.005 | 8.34 | 18.45 | — | — | 0.01 | 0.004 | 72 μm | 565 | 60 |
| 11 | SUS316† | 0.052 | 0.48 | 1.1 | 0.009 | 0.004 | 12.7 | 17.8 | 2.08 | — | 0.02 | 0.005 | 85 μm | 565 | 55 |
| 12 | SUS410L† | 0.022 | 0.61 | 0.48 | 0.012 | 0.008 | — | 12.06 | — | — | 0.01 | 0.006 | 74 μm | 383 | 32 |
| 13 | SUS430† | 0.054 | 0.47 | 0.52 | 0.018 | 0.004 | — | 17.41 | — | — | 0.03 | 0.004 | 95 μm | 517 | 30 |
| 14 | SUS329J1† | 0.046 | 0.59 | 1.16 | 0.022 | 0.005 | 4.05 | 24.87 | 2.21 | — | 0.02 | 0.005 | 70 μm | 622 | 26 |
| 15 | SQV1A† | 0.157 | 0.243 | 1.22 | 0.017 | 0.008 | — | — | — | — | 0.05 | 0.006 | 87 μm | 655 | 25 |
| 16 | STPG370† | 0.173 | 0.219 | 0.67 | 0.029 | 0.037 | — | — | — | — | 0.03 | 0.004 | 78 μm | 393 | 31 |
| 17 | 12Cr steel | 0.133 | 0.45 | 0.48 | 0.015 | 0.011 | — | 11.5 | — | — | 0.03 | 0.005 | 76 μm | 758 | 28 |
| 18 | Mild steel | 0.148 | 0.21 | 0.52 | 0.015 | 0.012 | — | — | — | — | 0.02 | 0.006 | 80 m | 382 | 35 |

*Fine grains obtained by MM + HIP + hot working process
**Fine grains obtained by rolling + heat treatment process
†Ordinary materials of JIS standard as reference materials FIG. 1 shows a picture of TEM structure of test pieces, where the average grain size was 250 nm.

In test pieces Nos. 1, 25, 6 and 7, Ti and C were added to precipitate TiC.

Plate materials shown in Table 1 were prepared as follows:

For test pieces Nos. 1, 2, 5, 6, 7, 8 and 9, gas-atomized powder was prepared on the basis of compositions of Table 1, and processed by mechanical milling (MM) in a high energy ball mill made from stainless steel (SUS 304), using SUS 304 stainless steel balls to obtain highly processed powder. The processed powder weighed about 1 kg.

MM-processed powder was subjected to vacuum canning into a mild steel can and processed by hot isostatic pressing (NIP) under isostatic pressure of 196 MPa using an inert gas as a medium. The HIP-processed materials were ultimately processed to a dimension of 3×50×200 mm² through a hot forging treatment. Details of processes for manufacturing fine grained materials and reference materials corresponding to the materials of Table 1 are summarized in Table 2.

TABLE 2

| No. | Material identification | Manufacturing processes |
|---|---|---|
| 1 | SUS304* | Gas-atomized raw material powder → (MM processing) → processed powder → (HIP at 850° C., 196 MPa) → solidified molding → (hot forging at 850° C.) |
| 2 | SUS316* | Gas-atomized raw material powder → (MM processing) → processed powder → (HIP at 850° C., 196 MPa) → solidified molding → (hot forging at 850° C.) |
| 3 | SUS304** | Molten material → (hot rolling-solid solution heat treatment by keeping at 1100° C., followed by quenching) → (90% cold rolling-keeping at 650° C. followed by quenching)[1] |
| 4 | SUS316** | Molten material → (hot rolling-solid solution heat treatment by keeping at 1100° C., followed by quenching) → (90% cold rolling-keeping at 650° C. followed by quenching)[1] |
| 5 | SUS410L* | Gas-atomized raw material powder → (MM processing) → processed powder → (HIP at 750° C., 800 MPa) → solidified molding |
| 6 | SUS430* | Gas-atomized raw material powder → (MM processing) → processed powder → (HIP at 750° C., 880 MPa) → solidified molding |
| 7 | SUS329J1* | Gas-atomized raw material powder → (MM processing) → processed powder → (HIP at 850° C., 196 MPa) → solidified molding |
| 8 | SQV1A* | Gas-atomized raw material powder → (MM processing) → processed powder → (HIP at 800° C., 196 MPa) → solidified molding |
| 9 | STPG370* | Gas-atomized raw material powder → (MM processing) → processed powder → (HIP at 800° C., 196 MPa) → solidified molding |
| 10 | SUS304† | Molten material → (hot rolling) → (solidification heat treatment (by keeping at 1100° C., followed by quenching) |
| 11 | SUS316† | Molten material → (hot rolling) → (solidification heat treatment (by keeping at 1100° C., followed by quenching) |
| 12 | SUS410L† | Molten material → (hot rolling) → (annealing by keeping at 750° C., followed by quenching) |
| 13 | SUS430† | Molten material → (hot rolling) → (annealing by keeping at 800° C., followed by quenching) |

TABLE 2-continued

Test pieces

| No. | Material identification | Manufacturing processes |
|---|---|---|
| 14 | SUS329J1† | Molten material → (hot rolling) → (solidification heat treatment by keeping at 1000° C., followed by quenching) |
| 15 | SQV1A† | Molten material → (not rolling) → (hardening-tempering by keeping at 900° C., followed by water cooling, than keeping at 610° C.) |
| 16 | STPG370† | Molten material → (hot rolling) |
| 17 | 12Cr steel | Molten material → (hot rolling) → (hardening-tempering by keeping at 980° C., followed by oil cooling and keeping at 740° C., followed by quenching) |
| 18 | Mild steel | Molten material → (hot rolling) → (tempering by keeping at 880°, followed by furnace cooling) |

*Fine grains obtained by MM + HIP + hot working process
**Fine grains obtained by rolling + heat treatment process
†Ordinary materials of JIS standard as reference materials
[1]The processing of 90% cold rolling keeping at 650° C., followed by quenching was repeated three times.

As to austenitic stainless steel Nos. 1 and 2, the powder is brought into a ultra-fined ferrite phase by utilizing highly processing-induced martensite transformation, and then subjected to solidification and heat processing treatment to occasion back-transformation to bring the bulk material into a fine grained austenite phase.

As to two-phase stainless steel No. 7, the austenite phase of the two phases is made into ultra-fine grains through the same processes as above.

Test pieces Nos. 5, 6 and 7 consisting of ferrite phase structure in part and Nos. 8 and 9 consisting of ferrite phase on the whole are adjusted by causing recrystallization in the course of solidification and heat processing step of highly processed powder, where grain growth is suppressed by precipitation of ultrafine grains of TiC or carbides of metal components in the materials, thereby producing ultra-fine grains.

Test piece No. 8 is manufactured through the hot processing step by temperature elevation from a lower temperature, i.e. according to a process for producing ultra-fine grains without martensitic transformation, whereas the structure of test piece No. 15 of Table 1 is formed through the ordinary hardening and tempering. For test pieces Nos. 3 and 4, the high processing step is carried out by rolling.

Butt welding was carried out according to welding combinations shown in Table 3, were, for example, a welding combination of No. 1 with No. 10 of Table 1 is given by "1–10".

Butt welding of all test pieces of Table 1 was not carried out, but the welding combinations shown in Table 3 were judged satisfactory for examples of butt welding of ultra-fine grained materials themselves, fine grain materials with different kinds of ordinary reference materials and austenitic stainless steel, ferritic stainless steel, two-phase stainless steel, ferritic steel and carbon steel according to the present invention.

Figure 2:
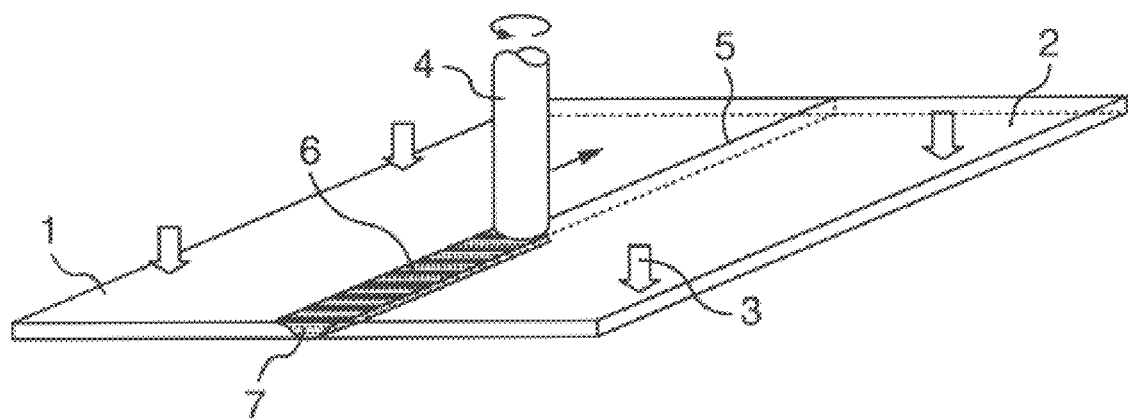
FIG. 2 is a schematic perspective view of butt friction stir welding.

FIG. 2 is a schematic perspective view showing a method for carrying out the friction stir welding. Test pieces 1 and 2 in combination is placed on an iron surface plate (not shown in the drawing), abutted edge by edge, and then fixed by securing jigs 3. High speed-rotating tungsten bar tool 4 is inserted into a weld part and moved along weld line 5 to conduct friction stir welding.

Weld bead 6 is formed after the welding, and a plastic flow zone, a plastic deformation zone and a heat-affected zone are formed from the center of weld cross-section 7 towards the base metal. Said tungsten tool 4 has a convex tip end, and on M screw is threaded at the small-diameter part (pin) at the remotest part of the tip end. The dimension of the small-diameter shoulder part is 5 mm in diameter and about 3 mm long. Large-diameter part is 10 mm in diameter. The small-diameter part is kept as inserted into the material until the shoulder part comes in contact with the pieces to be welded. Rotation speed is set to 1,300 rpm and the moving speed is set to 150 mm/min. The rotation speed and the moving speed are variable, but in this Example, they were set as given above. Welding temperature was measured at welding of test pieces Nos. 1, 5, 8 and 18 by embedding a thermocouple into the abutted pieces at the back side.

Temperature just on the back side of welding bead was in a range of 950° to 1,150° C. in all the cases, which was corresponded to about ⅔ of the melting points as in the case of the aforementioned Al alloy. Downward load was measured at the welding by a load cell provided at the back side of the test pieces-fixed surface plate, and it was found that the pressure on the tool at the welding was 25 to 65 MPa.

Figure 3:
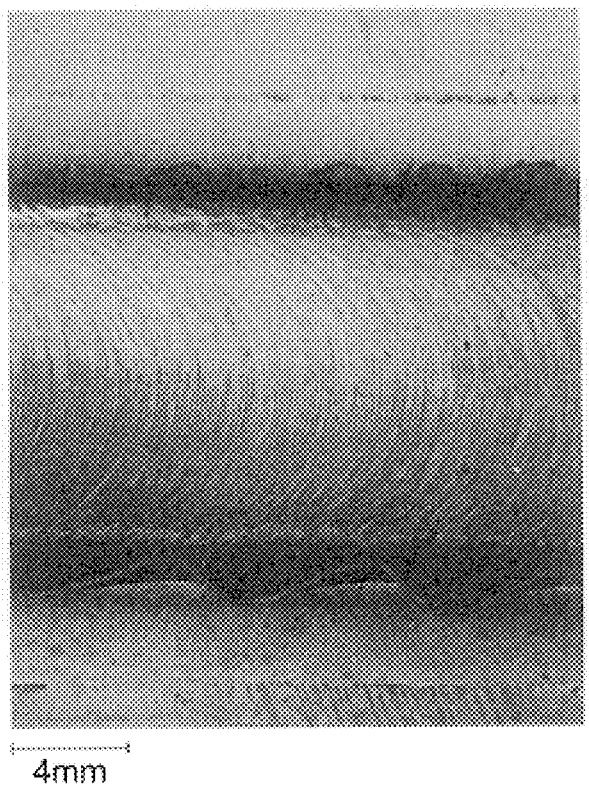
FIG. 3 is a picture of friction stir welding zone of ultra-fine grained stainless steel (SUS 304).
Figure 4:
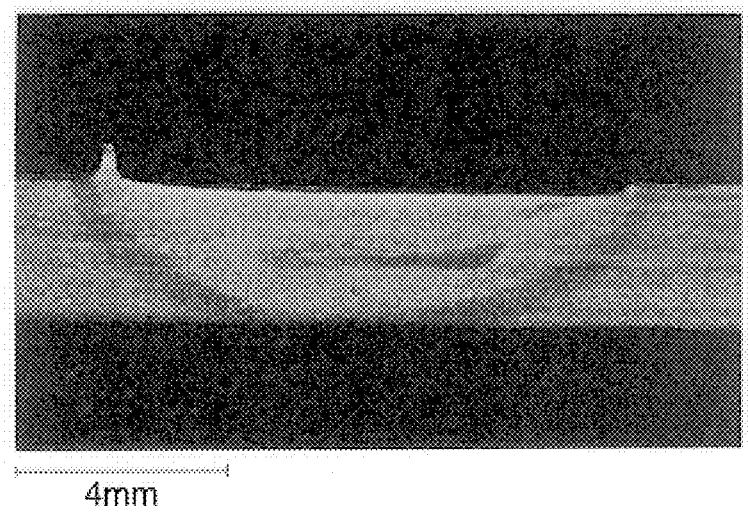
FIG. 4 is a picture of the cross-section of friction stir welding zone of FIG. 3.
Figure 5:
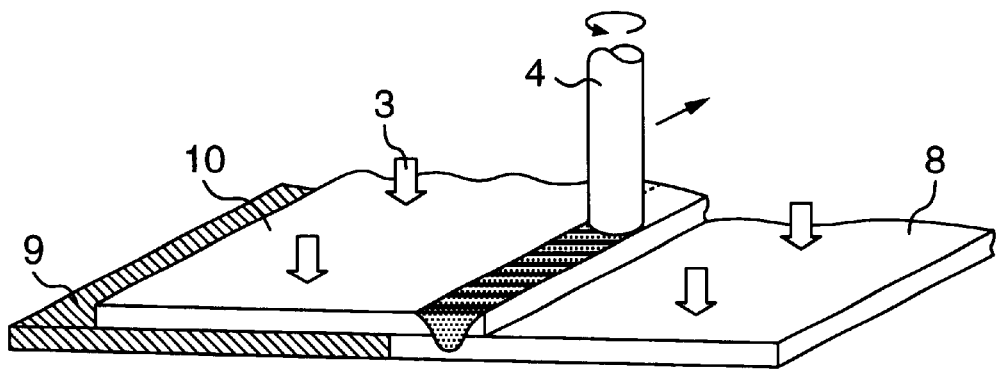
FIG. 5 is a schematic perspective view of lap friction stir welding.

FIG. 3 shows a picture of 1-1 joint appearance as a typical example, and FIG. 5 shows a picture of cross-section thereof at the joint. It is apparent from these pictures that welding was effected without any welding failure.

Weld bead width was substantially identical with tool shoulder diameter, and it was found from the cross-sectional shape that the abutted edges of 1-1 joint were welded down to the back side as if the abutted edge zones were completely stirred. In all the butt welding tests as given in Table 3, similar results were obtained. Structurally, the grain sizes in the stirred zone of 1-1 joint was 440 nm and thus the grains were not so coarsened. That is, it can be concluded that the friction stir welding is a welding process capable of sufficiently maintaining a fine grained structure.

Table 3 summaries features of evaluation results of butt welding tests according to this Example. Evaluation of grain sizes in the stirred zone was made on the basis of average grain sizes d of fine grains:

○: the grain sizes in the stirred zone were not more<d.
Δ: grain sizes were in a range of over 2d to those of ordinary reference materials (Nos. 10 to 16).

Evaluation of tensile strength was made as follows:

○: in a range of from fine grain sizes to 5 m
Δ: in a range of from more than 5 m to the grain size of reference materials Evaluation of plastic elongation was made as follows:

○: Over 10%
Δ: in a range of 3 to 10%.

Overall evaluation of the joint was made as follows:

○: satisfactory

TABLE 3

| Joint combination | Grain size evaluation of stirred zone | Evaluation of tensile strength | Evaluation of elongation | Overall evaluation | Remark |
|---|---|---|---|---|---|
| 1-1 | ○ | ○ | ○ | ○ | Broken at a strength of 876 MPa near positions between the stirred zone and base metal. Elongation: 16%. |
| 2-2 | ○ | ○ | ○ | ○ | Similar strength characteristics to those of 1-1. |
| 3-3 | ○ | ○ | ○ | ○ | Grain sizes increased up to 870 nm. More grain growth than that of 1-1. |
| 4-4 | ○ | ○ | ○ | ○ | Grain sizes increased up to 920 nm. |
| 5-5 | ○ | ○ | ○ | ○ | Grain sizes were about 5 times as much. Elongation increased 1.7 times as long. |
| 6-6 | ○ | ○ | ○ | ○ | Grain sizes were about twice as much. Elongation increased 2.3 times as long. |
| 7-7 | ○ | ○ | ○ | ○ | Grain growth of ferrite phase was more than that of austenite phase. |
| 8-8 | Evaluation failed | ○ | Δ | ○ | The stirred zone had a trace of martensitic transformation. Exact grain size measurement failed. Broken on base metal side. |
| 9-9 | Evaluation failed | ○ | Δ | ○ | Similar to 8-8. |
| 1-5 | ○ | ○ | ○ | ○ | In the stirred zone, austenite phase and ferrite phase was discretely mixed. Broken in the weld zone. |
| 1-7 | ○ | ○ | ○ | ○ | In the stirred zone, austenite phase and two-phase structure of austenite ferrite were mixed. Broken in the weld zone. |
| 2-6 | ○ | ○ | ○ | ○ | Similar to 1-5. |
| 1-9 | Evaluation failed | ○ | Δ | ○ | Broken in the stirred zone of mixed structures. In ferrite phase of No. 9 there was found a trace of martensitic transformation. |
| 5-9 | Evaluation failed | ○ | Δ | ○ | Broken in the stirred zone. In ferrite phase of No. 9 there was found a trace of martensitic transformation. |
| 1-10 | ○ | ○ | ○ | ○ | The stirred zone was in a mixed state of fine grains and ordinary material structure. Grain sizes of the ordinary material became smaller. |
| 2-11 | ○ | ○ | ○ | ○ | Similar to 1-10. |
| 5-12 | ○ | ○ | ○ | ○ | The stirred zone was in similar structure to that of 1-10 as ferrite phase. Broken on No. 12 side. Elongation: 22%. |
| 6-13 | ○ | ○ | ○ | ○ | Similar structural characteristics to those of 5-12. |
| 7-14 | ○ | ○ | ○ | ○ | The stirred zone was in a mixed structure. As in 1-10, grain sizes were smaller on the fine grain side than No. 14 side. |
| 8-15 | Evaluation failed | ○ | Δ | ○ | Elongation was mainly on No. 15 size. Broken between weld zone and base metal. Stirred zone underwent martensitic transformation. |
| 9-16 | Evaluation failed | ○ | Δ | ○ | Similar characteristics to those of 8-15. |
| 1-16 | Evaluation failed | ○ | Δ | ○ | In the stirred zone of mixed structure, a trace of martensitic transformation was found on No. 16 size. |
| 2-15 | Evaluation failed | ○ | Δ | ○ | Grain growth of No. 2 was about twice as much. In No. 15, there was found a trace of martensitic transformation. |
| 5-15 | Evaluation failed | ○ | Δ | ○ | In the stirred zone of mixed structure, grain growth was found on No. 5 side, but the ferritic steel had similar characteristics to the above. |
| 7-16 | Evaluation failed | ○ | Δ | ○ | In the stirred zone, mixed structure of two kinds of steel had similar characteristics to those of No. 5-15. |
| 5-17 | Evaluation failed | ○ | Δ | ○ | In the stirred zone, there was found a trace of martensitic transformation on 12Cr steel side. |
| 1-18 | ○ | ○ | ○ | ○ | The stirred zone was in a mixed structure of fine grains of No. 1 and mild steel, and a trace of martensitic transformation was found on mild steel side. |
| 8-18 | Evaluation failed | ○ | Δ | ○ | Elongation: 18% on mild steel base metal side. |

Tensile tests of joint were carried out by cutting from a welded material a shouldered test piece of a dimension of 2×4×25 mm³, whose deformable part includes an about 10 mm-wide weld zone at the center, Overall review of the results of butt welding is summarized as follows:

In the welding of fine grains themselves, grain growth was observed, but the stirred zone was in a fine grained structure with satisfactory strength characteristics. In the welding with foreign materials, the stirred zone was not in a mutually mixed homogeneous structure in terms of a microscopic level, but in a two-phase mixed structure where mutual structures were microscopically observable, where fine grained stainless steel of Nos. 1 to 7 remained still in a fine grain state, though they underwent grain growth. In case of welding with counterpart joints Nos. 10 to 14, grains themselves were discretely observable, but the grain sizes were likewise thoroughly larger than those of fine grains.

Figure 9:
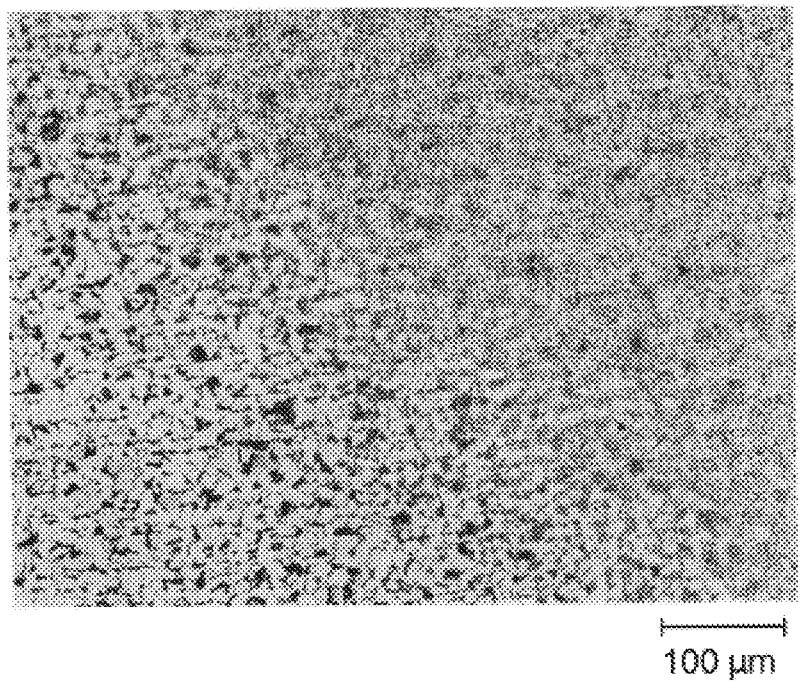
FIG. 9 is an optical micrograph showing structure of boundary between a joint subjected to martensitic transformation and a base material.
Figure 10:
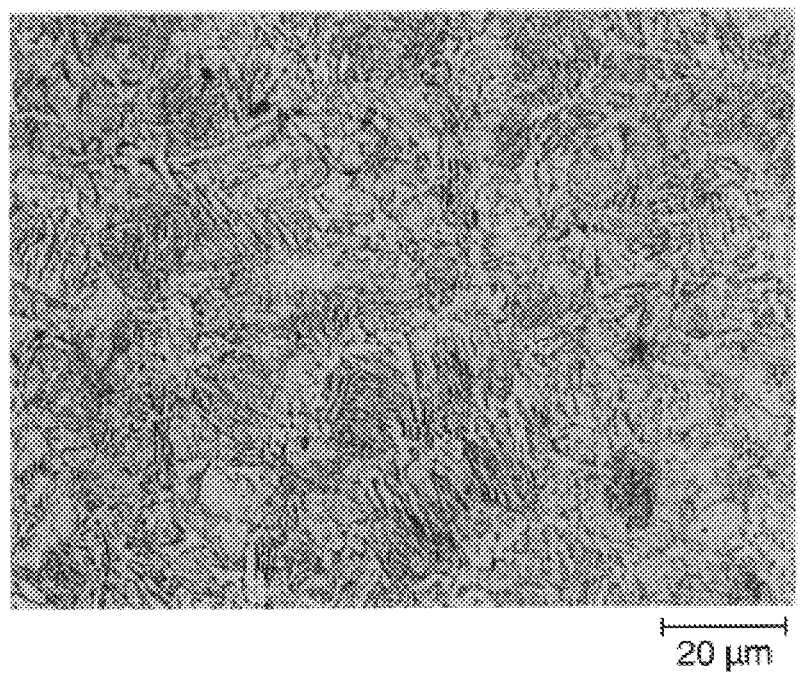
FIG. 10 is an optical micrograph showing structure of a joint subjected to martensitic transformation.

In case of welding with counterpart joints Nos. 8 and 9 or Nos. 15, 16, 17 and 18, the stirred zone underwent temperature elevation to about 1,000° C. and successive cooling when welded, even if they were fine grains, and consequently traces of martensitic transformation were observable. FIG. 9 shows a structure at boundary between the joint of 8–18 and No. 18 base material. As shown in FIG. 10, a martensitic structure is formed. In such structures, the strength characteristics were found unsatisfactory, and the tensile tests revealed that the readily deformable base metal took part in deformation.

Throughout Table 3, overall evaluation "○" is marked, but to improve the strength of weld zones, the martensite phase remaining in the stirred zone disappeared by subjecting tensile test pieces of 8-8, 9-9, 1-9, 5-9, 8-15, 9-16, 1-16, 2-15, 5-16, 7-16 and 5-17 to heat treatments of tempering, annealing, etc. of Nos. 15 to 18 given in Table 3, individually, for a short time, and as a result discrete grains were observable and deformation characteristics of weld zone were improved.

When the strength characteristics of weld zones in the welded structural components are found unsatisfactory due to generation of martensitic transformation by friction stir welding, sound welded structural components can be obtained by heat treating parts or the whole including the weld zones in the above-mentioned manner.

EXAMPLE 2

Weldability of fine grained materials can be basically well evaluated by the butt welding of Example 1. This Example shows various welding processes to be utilized for the welded structural components, where embodiments of lap welding as shown in FIG. 5 will be described. Though the lap welding differs from butt welding, combinations of 1-1, 1-10 and -12 of Table 3 were used as typical examples.

Cases that martensitic transformation were generated by friction stir welding were excluded due to the complicatedness of the successive annealing heat treatment. Dimensions of plate materials were the same as used in Example 1. One plate material 8 was placed on a surface plate whereas iron support material 9 having the same thickness was placed on the surface plate so as to abut said plate material 8. Another plate material 10 is placed thereon so as to overlap with said plate material 8. Then, plate materials each were fixed by press jig 3 and 10.

Overlapping width was 15 mm. Tungsten tool 4, 12 mm in shoulder diameter, 6 mm in pin diameter, and 5 mm in pin length, was used for welding at a rotation speed of 1,500 rpm and a moving speed of 150 mm/min. Welding depth was 5 mm-odd, where the lower plate material 8 was stir welded down to 2 mm-odd.

Though the strength tests were not carried out, the observation of welding cross-section by an optical microscope ad structural observation by SEM gave the same evaluation of results as in Example 1. Even if the overlapped positions of plates 8 and 10 were interchanged, the state of stir-welded zone remained unchanged. Only three typical combinations were subjected to the lap welding, but satisfactory welding will be expectable even for other combinations.

EXAMPLE 3

Figure 6:
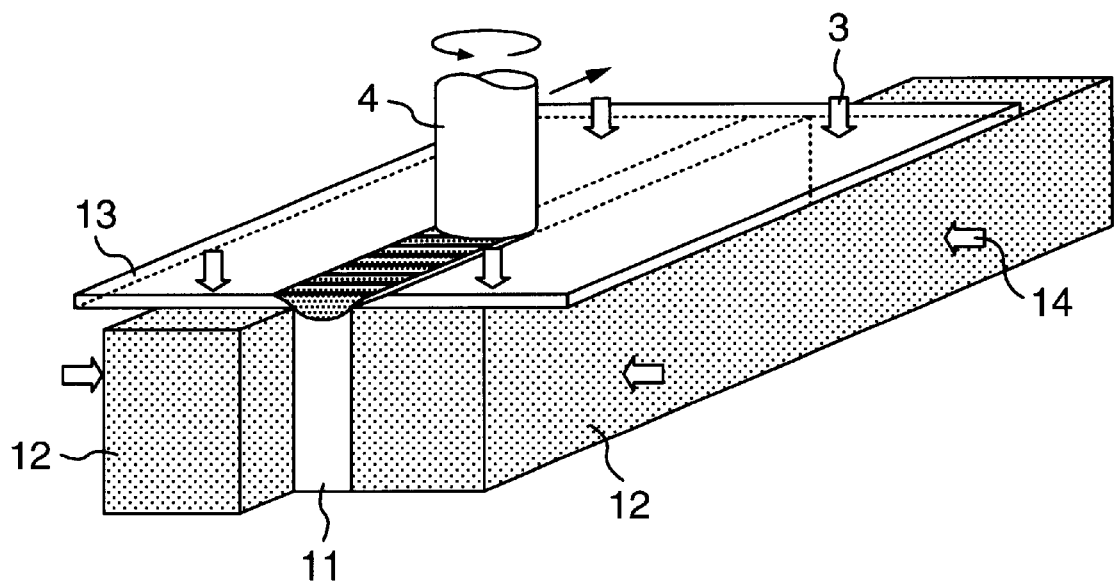
FIG. 6 is a schematic perspective view of T-type friction stir welding.

Embodiments of T-type joint welding as shown in FIG. 6 will be described below. Combinations of 1-1, 1-10 and 6-13 as shown in Table 3 were used as typical examples of the present welding. Dimensions of plate materials were the same as in Example 1.

Iron support materials 12 were arranged to pinch one upright plate material 11, and another plate material 13 was placed thereon so that the center line of plate material 13 could be located on said upright plate material 11. The plate materials each were fixed by press jigs 3 and 14.

Tip end dimensions of tungsten tool 4 were the same as in Example 2. Welding was carried out at a rotation speed of 1,500 rpm and a moving speed of 150 mm/min. Welding state was the same as in Example 2.

Though the strength tests were not carried out, the observation of welding cross-section by an optical microscope and structure observation by SEM gave the same evaluation of results as in Example 1. Same satisfactory welding characteristics will be expectable even for other combinations.

EXAMPLE 4

Figure 7:
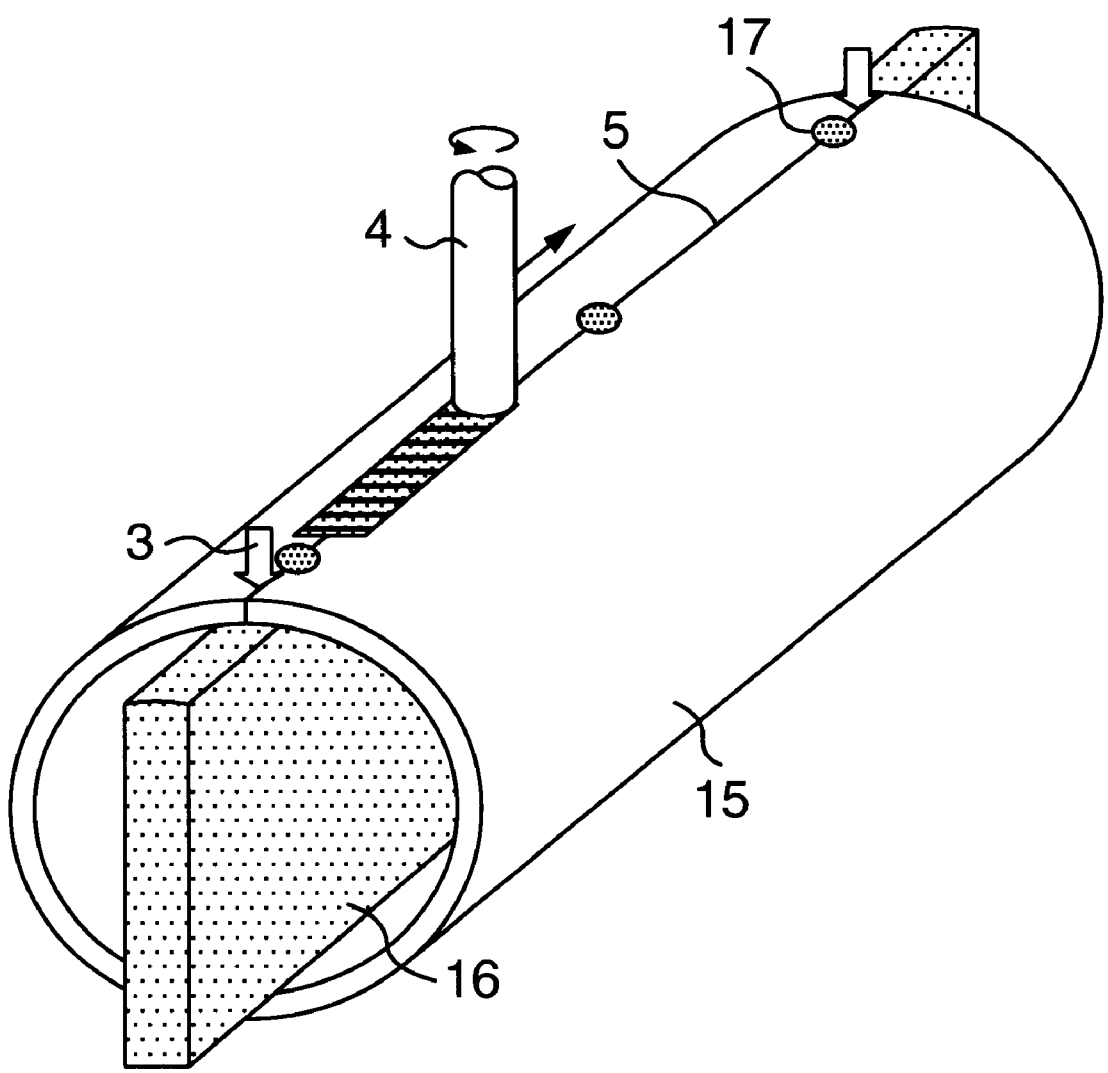
FIG. 7 is a schematic perspective view of fabrication of a pipe by friction stir welding.

Embodiments of T-type joint welding as shown in FIG. 7 will be described below. By the present welding, pipes were manufactured from materials Nos. 1, 3, 5 and 7 of Table 1 as typical examples.

Plate material of No. 1, 3, 5 or 7, in dimensions of 3×100×200 $m^3$ was deformed by bending to form cylindrical material 15, and then iron support plate 16 was abutted thereto along a line just under the butt line, i.e. weld line 5. Then, side edges of cylindrical material 15 were subjected to tack welding 17 by spot welding or friction stir welding so that the side edges may not be departed from each other.

Then, the support plate was fixed and then the cylindrical material was fully fixed by press jigs 3. Tool 4 was inserted into said weld line 5 and moved along said weld line 5 to prepare a pipe. Unwelded edge parts at both ends were removed by cutting.

Tungsten tool 4 had such tip end dimensions as 8 mm in shoulder diameter, 4 mm in pin diameter and less than 2 mm in length. Welding was carried out at a rotation speed of 1,700 rpm and a moving speed of 130 mm/min.

Welding state was found same as in Example 1. Though the strength tests were not carried out, observation of welding cross-section by an optical microscope and structural observation by SEM gave the same evaluation of results as in Example 1. The same satisfactory welding characteristics will be expectable for other combinations.

EXAMPLE 5

Figure 8:
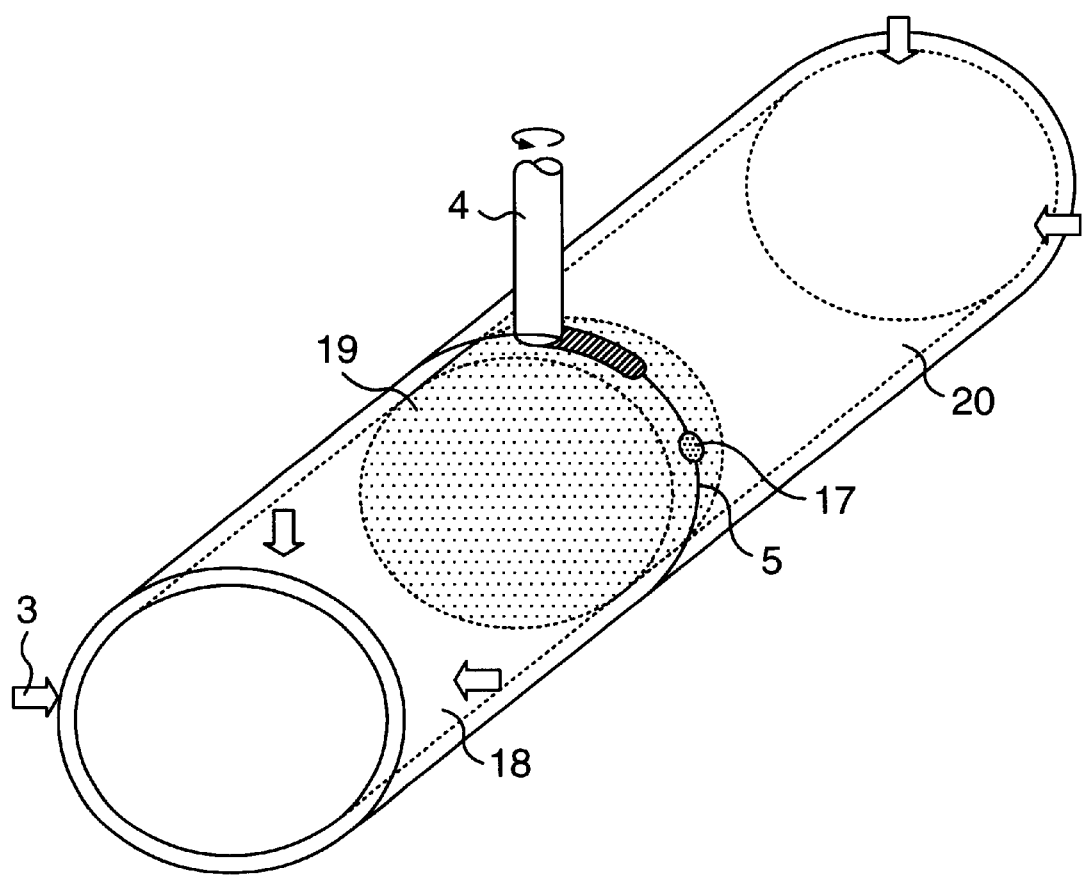
FIG. 8 is a schematic perspective view of friction stir welding of pipes.

Embodiments of pipe joint welding as shown in FIG. 8 will be described below. Pipe materials Nos. 1, 6, 10 and 13 were prepared in the same manner as in Example 4. In the present welding, combinations of 1-1, 1-10 and 6-13 of Table 3 were used as typical examples.

Pipes were each 150 mm long. Disc-shaped support material 19 having a diameter sufficiently close to the pipe inner diameter was inserted into pipe material 19 to a depth of nearly one-half of the disc thickness, whereas other half of the disc was inserted into another pipe 20. Tack welding was carried out at 4 diagonally located points to prevent the abutted edges (weld line 5) from departing from each other as in Example 4.

Both outer ends of pipes were fixed by press jigs 3, and then tool 4 was inserted into weld line 5. Tool 4 was rotated at a rotation speed of 1,700 rpm, but not moved, whereas the entirely of the pipes was rotated at the center of the pipes to weld both pipes at a weld moving speed of 130 mm/min.

Welding state was found same as in Example 2. Though the strength tests were not carried out, the observation of welding cross-section by an optical microscope and structural observation by SEM gave the same evaluation of results as in Examples 2 and 3. Same satisfactory welding characteristics will be expectable for other combinations.

In the foregoing Examples 1 to 5, typical friction stir welding processes were carried out, but other friction stir welding such as welding of materials with different thicknesses necessary for welding structural components, fillet welding by laying down and fixing a filler at the intersection of 2 plates and welding, etc. can be substantially carried out. Friction stir welding can be fully applied to welding of structural components based on combinations with fine grained materials.

According to the present welding process for iron-based ultra-fine grained materials, joints between fine grained materials themselves or between fine grained materials and grained materials having grain sizes of not less than 5 μm can be obtained without impairing distinguished strength and corrosion resistance of ultra-fine grained materials, or structural components including straight or curved joints can be manufactured.

The structural components including the aforementioned joints show distinguished characteristics, e.g. strength, corrosion resistance, etc. of ultra-fine grained materials.

It will be further understood by those skilled in the art that the foregoing description has been made on embodiments of the invention and that various changes and modifications may be made in the invention without departing from the spirit of the invention and the scope of appended claims.

What is claimed is:

1. A process for welding iron-base materials, which comprises welding the same or different kinds of iron-base materials, at least one of which is an iron-base ultra-fine grained material free from any amorphous phase and having an average grain size d in a range of $10 \text{ nm} < d \leq 5 \times 10^3$ nm, by friction stir welding.

2. A process for welding iron-base materials, where the iron-base materials are iron-base ultra-fine grained materials free from any amorphous phase, which comprises welding two kinds of the ultra-fine grained materials of chemically and crystallographically same or different kinds with one another, whose average grain sizes d are in a range of $10 \text{ nm} < d \leq 5 \times 10^3$ nm, by friction stir welding.

3. A process for welding iron-base materials, where the iron-base materials are iron-base ultra-fine grained materials free from any amorphous phase, which comprises welding one kind of the ultra-fine grained materials, whose average grain sizes d are in a range of $10 \text{ nm} < d \leq 5 \times 10^3$ nm with another kind or other kinds of the grained materials of chemically and crystallographically same or different kinds, whose average grain sizes d are in a range of $5 \times 10^3 \text{ nm} < d$, by friction stir welding.

4. A process for welding iron-base materials, where the iron base materials are austenitic stainless steel, which comprises welding two kinds of the stainless steel from one another, whose average grain sizes d are in a range of $10 \text{ nm} < d \leq 5 \times 10^3$ nm, by friction stir welding.

5. A process for welding iron-base materials, where the iron-base materials are austenitic stainless steel, which comprises welding one kind of the fine grained stainless steel, whose average grain sizes d are in a range of $10 \text{ nm} < d \leq 5 \times 10^3$ nm, with another kind of the stainless steel, whose average grain sizes d are in a range of $5 \times 10^3 \text{ nm} < d$, by friction stir welding.

6. A process for welding iron-base materials, where the iron-base materials are ferritic stainless steel with not more than 0.12 wt. % C, free from any of martensite phase and tempered martensite structure, which comprises welding two kinds of the stainless steel with one another, whose average grain sizes d are in a range of $10 \text{ nm} < d \leq 5 \times 10^3$ nm, by friction stir welding.

7. A process for welding iron-base materials, where the iron-base materials are ferritic stainless steel with not more than 0.12 wt. % C, free from any of martensite phase or tempered martensite structure, which comprises welding one kind of the fine grained stainless steel, whose average grain sizes d are in a range of $10 \text{ nm} < d \leq 5 \times 10^3$ nm, with another kind of the stainless steel, whose average grain sizes d are in a range of $5 \times 10^3 \text{ nm} < d$, by friction stir welding.

8. A process for welding iron-base materials, where the iron-base materials are two-phase stainless steel, which comprises welding two kinds of the stainless steel, whose existing austenite phase and ferrite phase average grain sizes d are in a range of $10 \text{ nm} < d \leq 5 \times 10^3$ nm, respectively, by friction stir welding.

9. A process for welding iron-base materials, where the iron-base materials are two-phase stainless steel, which comprises one kind of the fine grained stainless steel, whose existing austenite phase and ferrite phase average grain sized d are in a range of $10 \text{ nm} < d \leq 5 \times 10^3$ nm, with another kind of the stainless steel whose existing austenite phase and ferrite phase average grain sizes d are in a range of $5 \times 10^3 \text{ nm} < d$, by friction stir welding.

10. A process for welding iron-base materials, where the iron-base materials are austenitic stainless steel, ferritic stainless steel and two-phase stainless steel of fine grained materials, whose average grain sizes d are in a range of $10 \text{ nm} < d \leq 5 \times 10^3$ nm, which comprises welding two of the different kinds of the stainless steel, with one another by friction stir welding.

11. A process for welding iron-base materials, which comprises one kind of austenitic stainless steel, ferritic stainless steel and two-phase stainless steel of fine grained materials, whose average grain sizes are in a range of $10 \text{ nm} < d \leq 5 \times 10^3$ nm, with another different kind of said three kinds of the stainless steel, whose average grain sizes d are in a range of $5 \times 10^3 \text{ nm} < d$, by friction stir welding.

12. A process for welding iron-base materials, where the iron-base materials are ferritic steel of fine grained materials with not more than 7 wt. % Cr and with a ferrite phase base metal, and carbon steel, which comprises welding two kinds of the steel, whose average grain sizes d are in a range of $10 \text{ nm} < d \leq 5 \times 10^3$ nm, by friction stir welding.

13. A process for welding iron-base materials, where the iron-base materials are ferritic steel with not more than 7 wt. % Cr and with a ferrite phase base metal, and carbon steel, which comprises welding one kind of the steel of fine grained materials, whose average grain sizes d are in a range of $10 \text{ nm} < d \leq 5 \times 10^3$ nm, with another kind of said steel, martensitic stainless steel and mild steel, whose average grain sizes d are in a range of $5 \times 10^3 \text{ nm} < d$, by friction stir welding.

14. A process for welding iron-base materials, which comprises welding one kind of austenitic stainless steel, ferritic stainless steel and two-phase stainless steel of fine grained materials, whose average grain sizes d are in a range of $10 \text{ nm} < d \leq 5 \times 10^3$ nm, with another kind of ferritic steel with not more than 7 wt. % Cr and with a ferrite phase base metal, whose average grain sizes d are likewise in a range of $10 \text{ nm} < d \leq 5 \times 10^3$ nm, and carbon steel, by friction stir welding.

15. A process for welding iron-base materials, which comprises welding one kind of austenitic stainless steel, ferritic stainless steel and two-phase stainless steel of fine grained materials, whose average grain sizes d are in a range of $10 \text{ nm} < d \leq 5 \times 10^3$ nm, with another kind of martensitic stainless steel, ferritic steel comprising a ferrite phase with not were than 7 wt. % Cr, whose average grain sizes d are in a range of $5 \times 10$ nm<d, carbon steel and mild steel, by friction stir welding.

16. A process for welding iron-base materials, which comprises welding one kind of ferritic steel of fine grained materials, whose average grain sizes d are in a range of $10 \text{ nm} < d \leq 5 \times 10^3$ nm, with not more than 7 wt. % Cr and with a ferrite phase base metal, and carbon steel with another kind of austenitic stainless steel, ferritic stainless steel and two-phase stainless steel, whose average grain sizes d are in a range of $5 \times 10^3$ nm<d, by friction stir welding.

17. A process for welding iron-base materials according to claim 1, wherein the welding is carried out in any of coolants including water, oil and an inert gas or while straying the coolant in the vicinity or over the entirety of welding zones.

18. A structural component obtained by welding of the same or different kinds of iron-base materials, at least one of which is an iron-base ultra-fine grained material free from any amorphous phase and having an average grain size d in a range of $10 \text{ nm} < d \leq 5 \times 10^3$ nm, by friction stir welding, wherein at least a joint being tempered or annealed.

19. A structural component according to claim 18, wherein the iron-base ultra-fine grained material having an average grain size d in a range of $10 \text{ nm} < d \leq 5 \times 10^3$ nm is one member selected from the group consisting of carbon steel, martensitic stainless steel, mild steel and ferritic stainless steel containing Cr in an amount of 7% by weight or less, and the joint obtained by friction stir welding is tempered or annealed at 600° C. to 850° C.

* * * * *